United States Patent Office 2,915,495
Patented Dec. 1, 1959

2,915,495

STABILIZED POLYMERIC 2,3-DICHLORO-1,3-BUTADIENE

Gelu Stoeff Stamatoff, Newark, Del., assignor to E. I. du Pont de Nemours and Company, Wilmington, Del., a corporation of Delaware No Drawing. Application April 23, 1956
Serial No. 579,729

6 Claims. (Cl. 260—45.7)

This invention relates to polymers of 2,3-dichloro-1,3-butadiene having improved heat stability and a method of obtaining heat stable 2,3-dichloro-1,3-butadiene polymers capable of melt fabrication.

It has been known heretofore that 2,3-dichloro-1,3-butadiene hereinafter also referred to as dichlorobutadiene, can be polymerized to form thermoplastic resins which can be heated to form fluid melts. The polymer can be fabricated into fibers and films by spinning the polymer from a solution or by casting the polymer from a solution. Articles such as films and fibers have good electrical and mechanical properties and have many uses. The polymer may be partially crystallized and subjected to drawing and orientation whereby mechanical properties can be improved. Thermoplastic polymers of dichlorobutadiene, however, have one disadvantage in that they are subject to decomposition when heated to above the melting point for any length of time. The polymer darkens in color, decreases in melt flow until a black, intractable mass is obtained. This degradation of the polymer appears to be catalyzed by iron. As a result of this degradation, polymers of dichlorobutadiene decompose to form dark intractable masses when melt fabrication, such as injection molding or melt extrusion, is attempted in conventional fabricating machines employed for other thermoplastic resins. The degraded polymer will completely clog the machine and make any fabrication extremely difficult.

It is, therefore, an object of the present invention to prepare novel polydichlorobutadiene compositions. Another object of the present invention is to prepare melt-stable polymers of dichlorobutadiene. It is a further object of the present invention to prepare polymers of dichlorobutadiene which are stabilized against iron catalyzed decomposition and can be fabricated in conventional extrusion and molding equipment. Other objects will be apparent hereinafter.

The objects of the present invention are accomplished by admixing with a thermoplastic polymer of dichlorobutadiene a melt stabilizer comprising from 0.1 to 10% by weight of the resin of a compound containing a hypophosphite radical in combination with from 0.1 to 10% by weight of the resin of an anti-oxidant selected from the class consisting of phenols and phenylamines. It was discovered that the combination of a hypophosphite salt and a phenylamine or phenol will inhibit the degradation of polymers of dichlorobutadiene during melt fabrication and thus enable the preparation of films, fibers and other articles employing conventional molding and extrusion equipment as used for thermoplastic polymers generally. The use of either of the two melt-stabilizer components alone does not result in any appreciable melt stabilization, but the combination of the two components prevents any significant decrease in the melt flow of the polymer when heated to extrusion or molding temperatures for periods over one hour.

The preferred hypophosphite stabilizer components are the alkali metal salts of hypophosphorous acid, although hypophosphorous acid and organic derivatives thereof may also be employed. Such organic derivatives include sodium phenyl phosphinate, and sodium isooctyl phenyl phosphinate. The preferred amount of this stabilizer component ranges from 0.1 to 2% by weight of the resin, although it is possible to employ larger quantities of the stabilizer component up to 10% if it is desired to do so. However, it was found that the addition of excess quantities over 2% did not increase the melt stability of the polymer, even when used without any other additives. The preparation of hypophosphites is well known, and commercially available hypophosphites may be employed.

The second stabilizer component employed in the melt stabilization of polymers of dichlorobutadiene, according to the process of the present invention, is an anti-oxidant selected from the class of phenols and phenylamines. The preferred anti-oxidants are those which have one or more hydroxy groups and one or more aromatic rings and triphenylamines. Thus, preferred anti-oxidants are such compounds as hydroquinone, triphenylamine, dodecyl phenol and conidendrin which is a 1,2,3,4 - tetrahydro - 6 - hydroxy - 4(4'hydroxy - 3'-methoxyphenyl) - 3 - (hydroxy methyl) - 7 - methoxy-2-naphthoic acid-γ lactone. This stabilizer component is preferably employed in quantities of 0.1 to 2% by weight of the resin, although larger quantities of the anti-oxidant, up to 10%, may be employed. However, it was found that larger quantities of the anti-oxidant beyond 2%, even when employed individually, did not increase the melt stability of polydichlorobutadiene. The anti-oxidants employed in the present invention are compounds known to those skilled in the art.

Although the two stabilizer components are generally two individual compounds, it is possible to combine both stabilizer components into one single compound. An example of such a compound is sodium p-dimethyl amino phenyl phosphinate.

Thermoplastic polymers of dichlorobutadiene are prepared by polymerizing the liquid monomer in an inert solvent. Although dichlorobutadiene can be polymerized by heating alone, it is generally preferred to employ a polymerization catalyst, since by employing a catalyst essentially complete conversion of monomer to polymer can be obtained. Catalysts useful in the polymerization of dichlorobutadiene are free radical catalysts such as diazonitriles and peroxides and coordination catalysts such as obtained by admixing a titanium compound with a reducing agent capable of reducing said titanium compound to a valence state below three as described in greater detail in copending application S.N. 450,243, filed August 16, 1954, by Anderson et al. The polymerization is preferably carried out in a 30 to 50% solution of dichlorobutadiene at elevated temperatures ranging from 70 to 100° C. Solvents useful in the polymerization of dichlorobutadiene are inert hydrocarbon solvents such as benzene, toluene, xylene, cyclohexane, decane and similar aliphatic and aromatic hydrocarbons. The polymer is soluble in the solvent at reaction temperatures and will still be partially dissolved on cooling to room temperature. To remove the polymer from the reaction mixture the polymer solution is poured into a non-solvent such as methanol or acetone.

The molecular weight of the polymer may be controlled by the amount of catalyst added, the amount of solvent employed and the temperature at which the polymerization is carried out. Increasing the amount of catalyst will decrease the molecular weight. An increase in the quantity of solvent will also decrease the molecular weight. Decreasing the reaction temperature will cause an increase in the molecular weight. By varying these three variables it is possible to obtain polydichlorobutadiene polymer having a wide range of melt-flow properties. The molecular weight useful for thermoplastic polymers corresponds to an inherent viscosity of 0.3 to 1.5. Inherent viscosity is defined by the following equation:

$$\eta inh = \frac{1n\eta_r}{C} \eta_r = \frac{\eta}{\eta_0}$$

wherein $\eta$ is the viscosity of a dilute solution (e.g. 0.1–0.5%) of the polymer in monochlorobenzene measured at 90° C., $\eta_0$ is the viscosity of monochlorobenzene measured at the same temperature, $\eta_r$ the relative viscosity, and C the concentration of the polymer in grams.

The stabilizer components of the present invention may be added to the polymer slurry or to the polymer solution. It is generally preferred to add the stabilizers in the form of a solution to the polymer slurry. The stabilizer is readily absorbed by the polymer and, after agitating the mixture for a reasonable time, the liquid medium may be filtered off or evaporated and the polymer dried to a powder. A useful solvent for the hypophosphite is methanol. Solvents employed for the phenylamines and phenols employed in the present invention are generally either methanol or acetone.

The melt stability of polydichlorobutadiene was tested by a method employed to measure the melt flow of such polymers as polyethylene and called the "melt index test," described in great detail in ASTM–1238–52T. In this test the polymer is placed into a small vertical barrel equipped with a narrow orifice, heated to a desired melt extrusion temperature and then forced by a piston driven by a variable weight through the orifice. The weight of the extrudate in grams obtained in ten minutes is referred to as the "melt index"; this measurement serves as a measure of the melt flow of the polymer and may be used to calculate the melt viscosity. In the melt stability tests employed in the examples hereinbelow, approximately 5 g. of the polymer was placed into a .4" diameter stainless steel barrel, heated to 192° C. and then forced by a piston supporting a 5 kg. weight through an orifice having a diameter of .08" and a land length of .302". The test was carried on intermittently over a period of an hour by removing the weight from the piston, but maintaining the temperature. As a result, a measure of the change of melt flow with time, and thus a measure of melt stability was obtained. The color of the extrudate obtained at each interval was a further measure of melt stability.

The following examples further illustrate the preparation of polymers and their stabilization by the method of the present invention.

EXAMPLE I

Into a glass reaction vessel equipped with stirrer and reflux condenser was charged under an atmosphere of nitrogen 840 g. of xylene, 420 g. of dichlorobutadiene and 0.422 g. of azobisisobutyronitrile. The reaction mixture was heated to 100° C. and agitated for a period of two hours. The resultant polymer solution was mixed with methanol in a Waring Blendor causing the polymer to precipitate and result in the formation of a slurry. On filtering, washing and drying, 417 g. of a solid white polymer was obtained. This polydichlorobutadiene was found to have an inherent viscosity of 0.96.

EXAMPLE II

Into a glass reaction vessel equipped with stirrer and condenser was charged under an atmosphere of nitrogen 100 g. of xylene, 50 g. of dichlorobutadiene, 0.01 mole of titanium tetrachloride, and 0.01 mole of lithium aluminum tetraethylcyclohexenyl. The reaction mixture was agitated for a period of 60 minutes at 30° C. The resultant polymer slurry was poured into excess methanol. On washing and drying, a solid, white polymer of dichlorobutadiene weighing 48 g. having an inherent viscosity of 1.5 was obtained.

EXAMPLE III

Dichlorobutadiene was polymerized by the methods set forth in the above-described examples employing xylene as the solvent and azobiisobutyronitrile as the catalyst under conditions set forth in Table I below. The inherent viscosity of the polymer and melt index of the polymer measured after 5 minutes of heating at 192° C. have been added. The melt index values were obtained by the test described hereinabove.

*Table I.—Polymerization of dichlorobutadiene*

| Polymer No. | Quantity of Monomer, g. | Quantity of Xylene, g. | Quantity of Catalyst, g. | Reaction Temp., ° C. | Reaction Time, hrs. | Inherent Viscosity of Polymer | Melt Index |
| --- | --- | --- | --- | --- | --- | --- | --- |
| 1 | 100 | 300 | 0.3 | 75–90 | 2.5 | 0.42 | 7 |
| 2 | 286 | 572 | 0.44 | 75–90 | 2 | 1.06 | 0.5 |
| 3 | 335 | 1,005 | 0.7 | 85–90 | 1.5 | 0.55 | 9 |
| 4 | 515 | 1,545 | 1.0 | 95–100 | 3 | 0.50 | 13 |
| 5 | 100 | 200 | 0.2 | 66–91 | 2 | 0.71 | 0.9 |
| 6 | 265 | 530 | 0.52 | 80 | 2 | 1.2 | 0.35 |
| 7 | 100 | 500 | 0.40 | 100 | 2 | 0.33 | 45 |

Samples of the polymer so obtained were slurried with methanol and the stabilizer components set forth in Table II were added as a solution in either methanol or acetone. The polymer was agitated rapidly in a Waring Blendor for a period sufficient to obtain a homogeneous mixture of polymer and stabilizer. The mixture was then filtered and dried. The resulting polymer was placed into a melt index tester at 192° C. and the melt index was measured at the intervals indicated. To obtain a good comparison, the melt index at 5 minutes heating was called 100 and decreased proportionally to the melt index as measured at that interval. The melt index, as obtained at 5 minutes, corresponds to the melt index listed in Table I.

Table II

| Test No. | Polymer | Hypophosphite | Percent | Anti-oxidant | Percent | Relative Melt Index After— | | | | | | |
|---|---|---|---|---|---|---|---|---|---|---|---|---|
| | | | | | | 5 Min. | 10 Min. | 20 Min. | 30 Min. | 40 Min. | 50 Min. | 60 Min. |
| 1 | 4 | | | | | 100 | 77 | 49 | 31 | 15 | Intractable | |
| 2 | 2 | | | | | Intractable | | | | | | |
| 3 | 2 | $KH_2PO_2H_2O$ | 2 | | | 100 | 73 | 42 | 25 | 16 | Intractable | |
| 4 | 5 | $NaH_2PO_2H_2O$ | 2 | | | 100 | 93 | 85 | 28 | 9 | Intractable | |
| 5 | 5 | $NaH_2PO_2H_2O$ | .91 | | | 100 | 46 | 16 | Intractable | | | |
| 6 | 3 | Sodium phenyl phosphinate | 2 | | | Intractable | | | | | | |
| 7 | 5 | | | Hydroquinone | 2.0 | 100 | 36 | Intractable | | | | |
| 8 | 1 | | | Diphenylamine | 2.0 | 100 | 21 | | 10 | 2 | Intractable | |
| 9 | 2 | | | Dodecylphenol | 2.0 | 100 | 54 | 18 | 4 | Intractable | | |
| 10 | 2 | | | β-Conidendrin | 2.0 | 100 | | 93 | 61 | 35 | 17 | 7 |
| 11 | 2 | | | Hydroquinone | 2.0 | 100 | | 68 | 30 | 12 | Intractable | |
| 12 | 2 | $NaH_2PO_2H_2O$ | 2.0 | ----do---- | 2.0 | 100 | 84 | 78 | 72 | 62 | 62 | |
| 13 | 6 | $NaH_2PO_2H_2O$ | 2.0 | ----do---- | 2.0 | 100 | 99 | 97 | 96 | 90 | 89 | |
| 14 | 3 | $NaH_2PO_2H_2O$ | 2.0 | N-Phenylphenothiazene | 2.0 | 100 | 91 | 91 | 87 | 87 | 86 | |
| 15 | 1 | $NaH_2PO_2H_2O$ | 2.0 | Triphenylamine | 2.0 | 100 | 105 | 95 | 102 | 98 | 94 | 91 |
| 16 | 2 | $NaH_2PO_2H_2O$ | 2.0 | p-tert. butyl catechol | 2.0 | 100 | 93 | 93 | 95 | 95 | 92 | 85 |
| 17 | 1 | $NaH_2PO_2H_2O$ | 2.0 | Dodecyl phenol | 2.0 | 100 | 99 | 96 | 89 | | 86 | 81 |
| 18 | 1 | $NaH_2PO_2H_2O$ | 2.0 | Diethylaniline | 2.0 | 100 | 89 | 81 | 75 | 67 | 72 | 64 |
| 19 | 4 | $NaH_2PO_2H_2O$ | 2.0 | β-Conidendrin | 2.0 | 100 | 103 | 98 | 97 | | 100 | 99 |
| 20 | 1 | $NaH_2PO_2H_2O$ | 2.0 | ----do---- | 2.0 | 100 | 99 | 102 | 108 | | 95 | 97 |
| 21 | 4 | $NaH_2PO_2H_2O$ | 1.0 | ----do---- | 1.0 | 100 | 89 | 87 | 97 | 86 | 83 | |
| 22 | 4 | $NaH_2PO_2H_2O$ | 0.5 | ----do---- | 0.5 | 100 | 100 | 103 | | 102 | 96 | 98 |
| 23 | 4 | $NaH_2PO_2H_2O$ | 0.25 | ----do---- | 0.5 | 100 | 98 | | 94 | 88 | 83 | |
| 24 | 6 | Sodium p-dimethyl amino phenyl phosphinate | | | 2.0 | 100 | 91 | 91 | 91 | | 80 | 76 |
| 25 | 3 | Sodium phenyl phosphinate | 2.0 | β-Conidendrin | 2.0 | 100 | 98 | 95 | 95 | 94 | 92 | 90 |

The results clearly show the melt stabilization obtained by the combination of a hypophosphite salt and an anti-oxidant containing aromatic unsaturation and hydroxyl groups or substituted amine groups. Although each individual stabilizer component may increase the melt stability of polydichlorobutadiene to a small extent, the desired melt stability is obtained only if the two components are combined.

The polymers of dichlorobutadiene stabilized by the process of the present invention have outstanding physical properties that make the polymers useful for many applications, particularly as coating materials and as insulating materials. Some of the physical properties of polydichlorobutadiene have been listed in Table III. These physical properties were measured on injection molded samples or on melt extruded films.

Table III.—*Properties of stabilized polymers of dichlorobutadiene*

| | |
|---|---|
| Tensile strength (ASTM D–638) p.s.i. | 4700 |
| Ultimate elongation (ASTM D–638) percent | 170 |
| Hardness (ASTM D–785) | 74R |
| Izod impact (ASTM D–256) | 301.2 |
| Vicat temperature | 149° |
| Flammability (ASTM D–635) | 2 |
| Volume resistivity (ASTM D–257–54T) ohms/an. | $10^{15}$ |
| Dielectric strength (ASTM D–149–44) (0.20″ film) volts/mil | 900 |
| Dielectric constant (ASTM D–150–54T): | |
| 100 cycles | 3.31 |
| 10,000 cycles | 3.05 |
| 1,000,000 cycles | 2.96 |
| Dissipation factor (ASTM D–150–54–T): | |
| 100 cycles | 0.0365 |
| 10,000 cycles | .0160 |
| 1,000,000 cycles | .00043 |

Since the melt stabilizers of the present invention stabilize dichlorobutadiene when polymerized to a thermoplastic essentially linear polymer, it is clear that the stabilizers may be employed to stabilize dichlorobutadiene in copolymers of dichlorobutadiene and other ethylenically unsaturated compounds which are thermoplastic in nature and can be melt fabricated.

The melt stabilization of dichlorobutadiene polymers has increased the usefulness of this polymer to a great extent. The present invention makes it possible to fabricate polymers of dichlorobutadiene by standard techniques in conventional equipment employed for the fabrication of thermoplastic polymers. The polymer is readily extruded into films and sheets and also extruded as wire coating. It may further be injection-molded into a variety of articles. Plasticizers, fillers and pigments are readily added to the stabilized polymer which can be repeatedly hot worked without any significant degradation.

As many widely different embodiments of this invention may be made without departing from the scope thereof, it is to be understood that this invention is not limited to the specific embodiments disclosed hereinabove, except as defined in the appended claims.

I claim:

1. A polymer of 2,3-dichloro-1,3-butadiene containing a melt stabilizer comprising from 0.1 to 10% by weight of the resin of a compound selected from the class consisting of alkali metal hypophosphites and sodium phenyl phosphinates in combination with from 0.1 to 10% by weight of the resin of an anti-oxidant selected from the class consisting of β-conidendrin, dodecyl phenol, hydroquinone, p-tertiary butyl catechol, diethyl aniline and triphenyl amine, said polymer having an inherent viscosity of 0.3 to 1.5.

2. A polymer of 2,3-dichloro-1,3-butadiene containing from 0.1 to 10% by weight of the resin of an alkali metal hypophosphite and from 0.1 to 10% by weight of the resin of triphenylamine.

3. A polymer of 2,3-dichloro-1,3-butadiene containing form 0.1 to 10% by weight of the resin of an alkali metal hypophosphite and from 0.1 to 10% by weight of the resin of hydroquinone.

4. A polymer of 2,3-dichloro-1,3-butadiene containing from 0.1 to 10% by weight of the resin of an alkali metal hypophosphite and from 0.1 to 10% by weight of the resin of β-conidendrin.

5. A polymer of 2,3-dichloro-1,3-butadiene as set forth in claim 4 wherein the alkali metal hypophosphite is sodium hypophosphite.

6. A polymer of 2,3-dichloro-1,3-butadiene as set forth in claim 4 wherein the alkali metal hypophosphite is potassium hypophosphite.

References Cited in the file of this patent

UNITED STATES PATENTS

| | | |
|---|---|---|
| 2,230,371 | Bolton | Feb. 4, 1941 |
| 2,445,739 | Rowland et al. | July 20, 1948 |
| 2,615,009 | St. John et al. | Oct. 21, 1952 |
| 2,725,373 | Reynolds | Nov. 29, 1955 |